United States Patent
Blomström et al.

(10) Patent No.: US 12,447,069 B2
(45) Date of Patent: Oct. 21, 2025

(54) DISPOSABLE HYGIENE ARTICLE

(71) Applicant: Essity Hygiene and Health Aktiebolag, Gothenburg (SE)

(72) Inventors: Philip Blomström, Gothenburg (SE); Shadi Ståhl, Mölndal (SE); Anna Bagger-Sjöbäck, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 1641 days.

(21) Appl. No.: 16/640,597

(22) PCT Filed: Aug. 22, 2017

(86) PCT No.: PCT/SE2017/050841
§ 371 (c)(1),
(2) Date: Feb. 20, 2020

(87) PCT Pub. No.: WO2019/039978
PCT Pub. Date: Feb. 28, 2019

(65) Prior Publication Data
US 2020/0170849 A1 Jun. 4, 2020

(51) Int. Cl.
*A61F 13/472* (2006.01)
*A61F 13/475* (2006.01)
(Continued)

(52) U.S. Cl.
CPC .... *A61F 13/4752* (2013.01); *A61F 13/47236* (2013.01); *A61F 13/5616* (2013.01);
(Continued)

(58) Field of Classification Search
CPC .............. A61F 13/4704; A61F 13/4751; A61F 13/4752; A61F 13/476; A61F 13/47236;
(Continued)

(56) References Cited

U.S. PATENT DOCUMENTS

| | | | |
|---|---|---|---|
| 5,387,210 A | | 2/1995 | Murakami |
| 5,391,162 A | * | 2/1995 | Widlund ............. A61F 13/5616 |
| | | | 604/385.04 |

(Continued)

FOREIGN PATENT DOCUMENTS

| | | |
|---|---|---|
| CL | 200902121 | 11/2009 |
| EP | 0581258 A1 | 2/1994 |

(Continued)

OTHER PUBLICATIONS

Colombian Patent Office, Office Action ssued in CO application No. NC2020/0001989 dated Aug. 2, 2021, 6 pages.

(Continued)

*Primary Examiner* — Catharine L Anderson
*Assistant Examiner* — Lynne Anderson
(74) *Attorney, Agent, or Firm* — CANTOR COLBURN LLP (57) ABSTRACT

Disposable hygiene article having a liquid-permeable topsheet, a liquid-impermeable backsheet and an absorbent core. The article is releasably attached to a garment and has liquid side barriers arranged substantially along longitudinal edges of the absorbent core. The article has a front portion, oriented upwards during use, having a tapering shape with a maximum width of the front portion, measured between first left and right edge points, and a minimum width, measured between second left and right edge points. A first imaginary connection line connects the first right edge point to the second right edge point and a second imaginary connection line connects the first left edge point to the second left edge point. The first and second imaginary connection lines extend in an angle ranging between 60° and 90° with the transverse direction T and have a length of at least 15% of the full length of the article.

26 Claims, 4 Drawing Sheets

(51) Int. Cl.
*A61F 13/56* (2006.01)
*A61F 13/514* (2006.01)
*A61F 13/84* (2006.01)

(52) U.S. Cl.
CPC ............... *A61F 2013/51443* (2013.01); *A61F 2013/8402* (2013.01); *A61F 2013/8497* (2013.01)

(58) Field of Classification Search
CPC .............. A61F 13/47245; A61F 13/494; A61F 13/49413; A61F 13/51394; A61F 13/5616; A61F 2013/4706; A61F 2013/51377; A61F 2013/8497
See application file for complete search history.

(56) References Cited

U.S. PATENT DOCUMENTS

| | | | |
|---|---|---|---|
| 6,632,208 B1 | 10/2003 | Mizutani | |
| 7,056,311 B2* | 6/2006 | Kinoshita | A61F 13/5616 604/385.03 |
| 7,078,583 B2* | 7/2006 | Kudo | A61F 13/47227 604/385.01 |
| 7,312,372 B2* | 12/2007 | Miyama | A61F 13/47218 604/382 |
| 7,922,706 B2* | 4/2011 | Konawa | A61F 13/4752 604/385.27 |
| 9,011,397 B2* | 4/2015 | Hopkins | A61F 13/539 604/385.01 |
| 9,730,844 B2 | 8/2017 | Miura et al. | |
| 11,039,963 B2* | 6/2021 | Olson | A61F 13/472 |
| 11,241,341 B2* | 2/2022 | Kuramochi | A61F 13/475 |
| 2003/0055392 A1* | 3/2003 | Tagami | A61F 13/4758 604/378 |
| 2004/0243087 A1 | 12/2004 | Kinoshita et al. | |
| 2006/0116653 A1 | 6/2006 | Munakata et al. | |
| 2010/0191209 A1 | 7/2010 | Nomoto et al. | |
| 2010/0262112 A1 | 10/2010 | Back et al. | |
| 2014/0343525 A1 | 11/2014 | Roh et al. | |
| 2015/0080830 A1 | 3/2015 | Miura | |
| 2015/0157251 A1 | 6/2015 | Nelson | |
| 2016/0051423 A1 | 2/2016 | Ota et al. | |
| 2017/0002098 A1 | 1/2017 | Ayoub et al. | |

FOREIGN PATENT DOCUMENTS

| | | |
|---|---|---|
| EP | 1124588 A1 | 8/2001 |
| EP | 1245240 A1 | 10/2002 |
| EP | 1842512 A1 | 10/2007 |
| EP | 2163229 A1 | 3/2010 |
| EP | 2281537 A1 | 2/2011 |
| ES | 2086778 T3 | 7/1996 |
| GB | 2306888 A | 5/1997 |
| JP | 2008148819 A | 7/2008 |
| RU | 109969 U1 | 11/2011 |
| WO | 9306805 A1 | 4/1993 |
| WO | 0025836 A1 | 5/2000 |
| WO | 2007069965 A1 | 6/2007 |
| WO | 2014193280 A1 | 12/2014 |
| WO | 2016068957 A1 | 5/2016 |

OTHER PUBLICATIONS

International Search Report and Written Opinion for International Application No. PCT/SE2017/050839, dated Apr. 11, 2018, 10 pages.
International Search Report and Written Opinion for International Application No. PCT/SE2017/050840, dated Apr. 11, 2018, 14 pages.
International Search Report and Written Opinion for International Application No. PCT/SE2017/050841, dated Apr. 11, 2018, 12 pages.
Australian Government, IP Australia, Examination report No. 1 for standard patent application issued in corresponding Australian Application No. 2017428325, dated Aug. 6, 2020, 5 pages.
Federal Service for Intellectual Property, Russia, Official Action and Search Report issued in corresponding Russian Patent Application No. 2020111224/03(018874), dated Aug. 11, 2020, 13 pages, with English Translation.
Australian Government, IP Australia, Examination report No. 1 for standard patent application issued in Australian Patent Application No. 2017428323, dated Aug. 4, 2020, 4 pages.
Federal Service for Intellectual Property, Russia, Official Notification of examination results and Search Report issued in Application No. 2020111223(018873), dated Aug. 11, 2020, 11 pages, with English translation.
Pinzon Pinzon & Asociados, Third Party Submission in Application No. NC2020/0001993 dated May 5, 2019, 19 pages (no English translation available).
European Patent Office, Extended Search Report issued in EP application No. 17922785.5-1102 dated Apr. 19, 2021, 4 pages.
Federal Service for Intellectual Property, Decision to Grant, Application No. 2020111224/03(018874) filed Aug. 22, 2017, 21 pages.
Malaysian Application No. PI2020000494; Malaysian Office Action dated Jul. 25, 2022; 3 pages.

* cited by examiner

DISPOSABLE HYGIENE ARTICLE

CROSS REFERENCE TO RELATED APPLICATIONS

This is a U.S. National Phase application of PCT/SE2017/050841, filed Aug. 22, 2017, the disclosure of which is incorporated herein by reference in its entirety for all purposes.

TECHNICAL FIELD

The present disclosure relates to disposable hygiene articles, such as adult incontinence articles, sanitary towels and panty liners or the like, provided with liquid side barriers.

BACKGROUND

Disposable hygiene articles have to meet high requirements. They should for example be discreet, soft and comfortable to wear and at the same time they should have a reliable security against leakage. Such disposable hygiene articles usually comprise a liquid-permeable topsheet, a liquid-impermeable backsheet and an absorbent core arranged between the topsheet and the backsheet.

During the use of disposable hygiene articles there is a risk that bodily discharges such as urine, menstrual fluids or other bodily fluids move on top of the liquid-permeable topsheet and leak past the edges of the article. Although liquid movements can take place in any direction for example in the longitudinal direction or in the transverse direction of the hygiene article, liquid movement in transverse direction of the hygiene article is particularly worrying because only a relatively small liquid movement in the transverse direction may cause the liquid to leak outside the longitudinal side edges of the hygiene article with the result that surrounding articles such as clothing, bedclothes, seat cushions are soiled by discharged liquid. The risk of so-called side-edge leakage is the highest during night, for example when sleeping on the side.

Some known hygiene articles are provided with liquid side barriers along the longitudinal edges of the absorbent core which are intended to reduce the risk of side-edge leakage. It has been found that the proper functioning of such liquid side barriers is highly dependent on the positioning of the hygiene article on the garment.

SUMMARY

It is an aim of the present disclosure to provide a disposable hygiene article provided with liquid side barriers with which a correct positioning of the article on a garment can be facilitated.

This aim may be achieved by a disposable hygiene article or a manufacturing process as defined in the independent claims.

According to an aspect of the present disclosure, a disposable hygiene article is provided, comprising a liquid-permeable topsheet, a liquid-impermeable backsheet and an absorbent core arranged between said topsheet and said backsheet, the absorbent core defining a longitudinal centre axis which extends substantially in the middle of the core in longitudinal direction L of the article. The disposable hygiene article is adapted to be releasably attached to a garment, such as underpants or briefs. In use of the article the topsheet is facing the crotch area of a user and the backsheet is facing away from the crotch area of the user. The article further comprises liquid side barriers arranged substantially along longitudinal edges of said absorbent core and provided to reduce or minimize side-edge leakage.

The article has a front portion which is intended to be oriented upwards towards the user's belly during use of the article. This front portion having a generally tapering shape with a first, maximum width of the front portion, measured in transverse direction T between first left and right edge points on opposite sides of said longitudinal axis, and a second, minimum width, measured in transverse direction T between second left and right edge points on opposite sides of said longitudinal axis. A first imaginary connection line connects the first right edge point to the second right edge point and a second imaginary connection line connects the first left edge point to the second left edge point. In various embodiments, the first and second imaginary connection lines may extend in an angle ranging between 60° and 90°, preferably 65° and 85°, more preferably 70° and 80° with said transverse direction T and have a length of at least 15% of the full length of the article, preferably between 18% and 37% of said full length, more preferably between 20% and 30% of said full length.

It has been found that the hygiene article having a front portion shaped as described above better conforms to the shape, in particular the edges, of undergarments, at least the most common shape thereof, and can thus facilitate the positioning of the article in or on such undergarment. In particular, it has been found that this shape of the front portion can help to ensure a good positioning of the article, especially the liquid side barriers, and thus reduce the risk of side-edge leakage.

In embodiments according to the present disclosure, the front portion may have left and right side edges extending substantially along said first and second imaginary connection lines. It has been found that side edges of the front portion which closely follow the first and second imaginary connection lines may further facilitate the positioning of the article on the garment. The side edges may for example be straight or curved.

In embodiments according to the present disclosure, the article may comprise, in said longitudinal direction L, the front portion, a middle portion and a back portion, the back portion having a generally tapering shape with a third, minimum width of the back portion, measured in transverse direction T between third left and right edge points on opposite sides of said longitudinal axis, and a fourth, maximum width of the back portion, measured in transverse direction T between fourth left and right edge points on opposite sides of said longitudinal axis. In an embodiment, the back portion preferably has a larger area than the front portion.

In embodiments according to the present disclosure, the fourth width is preferably greater than the first width.

In embodiments according to the present disclosure, a third imaginary connection line connects the third right edge point to the fourth right edge point and a fourth imaginary connection line connects the third left edge point to the fourth left edge point, and the third and fourth imaginary connection lines may extend in an angle ranging between 40° and 85°, preferably between 50° and 75°, more preferably between 60° and 70° with said transverse direction T and have a length of at least 9% of said full length, preferably between 12% and 44% of said full length, more preferably between 15% and 30% of said full length. It has been found that the hygiene article having a back portion shaped as described above better conforms to the shape, in particular the edges, of undergarments, at least the most common shape thereof, and can thus further facilitate the positioning of the article in or on such undergarment.

In embodiments according to the present disclosure, the front portion may have a length in said longitudinal direction ranging between 22% and 32% of said full length, the middle portion may have a length in said longitudinal direction ranging between 27% and 35% of said full length, and/or the back portion may have a length in said longitudinal direction ranging between 35% and 45% of said full length.

In embodiments according to the present disclosure, the first width may range between 62% and 88% of the full width of the article, the second width may range between 45% and 65% of said full width, the third width may range between 45% and 65% of said full width, and/or the fourth width may range between 62% and 100% of said full width.

In embodiments according to the present disclosure, said liquid side barriers may form part of side layers which are arranged substantially along the longitudinal edges of the absorbent core, the liquid side barriers, or at least part thereof, being formed by portions of the side layers which extend above the topsheet while being loose therefrom at least in the middle portion of the article. It has been found that such portions of such side layers which extend above the topsheet while being loose therefrom at least in the middle portion of the article may form, or form part of, the liquid side barriers and/or assist in reducing the risk of side-edge leakage.

In embodiments according to the present disclosure, the liquid side barriers may be provided for being at least partly raised to a substantially upright position in use. The raising of at least part of the side barriers in use may enhance the barrier and thus further reduce side-edge leakage.

In embodiments according to the disclosure, the hygiene article may further comprise flexible side flaps arranged on opposite sides of the absorbent core and provided for attaching the article to a garment, for example by being folded around a crotch part of said garment.

In embodiments according to the present disclosure, the liquid said side barriers may be provided for being at least partly raised by folding said flexible side flaps to a position in which said hygiene article is secured to said garment.

In embodiments according to the present disclosure, the liquid side barriers may be provided for being at least partly raised by folding said flexible side flaps substantially along seams, by which the side layers are attached to longitudinal edge portions of the topsheet.

In embodiments according to the present disclosure, the flexible side flaps may each comprise a side portion of said backsheet and/or a side portion of said side layer. The side layer and the backsheet may be attached to each other, preferably along the outer edges of the side portions. The attachment of these layers to each other may have the effect that upon folding of the side flaps, preferably along or in the vicinity of the seams, tension is created which may assist in raising the side barriers to the substantially upright position.

In embodiments according to the present disclosure, said side layers may each comprise a multiple layered section where the side layer is folded at least once, said multiple layered sections forming, or forming part of, said liquid side barriers. Such a multi-layer construction may strengthen the liquid side barriers and further reduce the risk of side-edge leakage.

In embodiments according to the present disclosure, the portions of the side layers, which form the liquid side barriers or part thereof, may extend over the full length of the article.

In embodiments according to the present disclosure, the loose portions of the side layers, which form the liquid side barriers or part thereof, may have a width in transverse direction T of the article ranging from 2.0 to 10.0 mm, preferably from 3.0 to 7.0 mm.

In embodiments according to the present disclosure, the liquid side barriers may consist entirely of or comprise non-elastic material, i.e. the need for elastic elements to ensure proper raising of the side barriers in use may be avoided.

In embodiments according to the present disclosure, the article may further comprise an acquisition layer positioned between said absorbent core and said topsheet.

In embodiments according to the present disclosure, the seams may be obtained by welding, such as ultrasonic welding, by applying a chemical compound such as an adhesive, by applying heat and/or pressure.

BRIEF DESCRIPTION OF THE DRAWINGS

The present disclosure will be discussed in more detail below, with reference to the attached drawings, in which.

DETAILED DESCRIPTION OF PARTICULAR EMBODIMENTS

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of or comprising components A and B, rather with respect to the present disclosure, the only enumerated components of the device are A and B, and further the claim should be interpreted as including equivalents of those components.

Disposable hygiene articles are absorbent articles aimed for personal hygiene and are arranged to absorb body exudate, such as blood or urine. Such disposable hygiene articles are single-use articles and comprise for example adult incontinence articles, sanitary towels and panty liners.

Generally, the disposable hygiene articles are releasably attachable on a garment, suitably an undergarment of a user, by means of an adhesive material. A first embodiment is described with reference to FIGS. 1 and 2.

Figure 1:
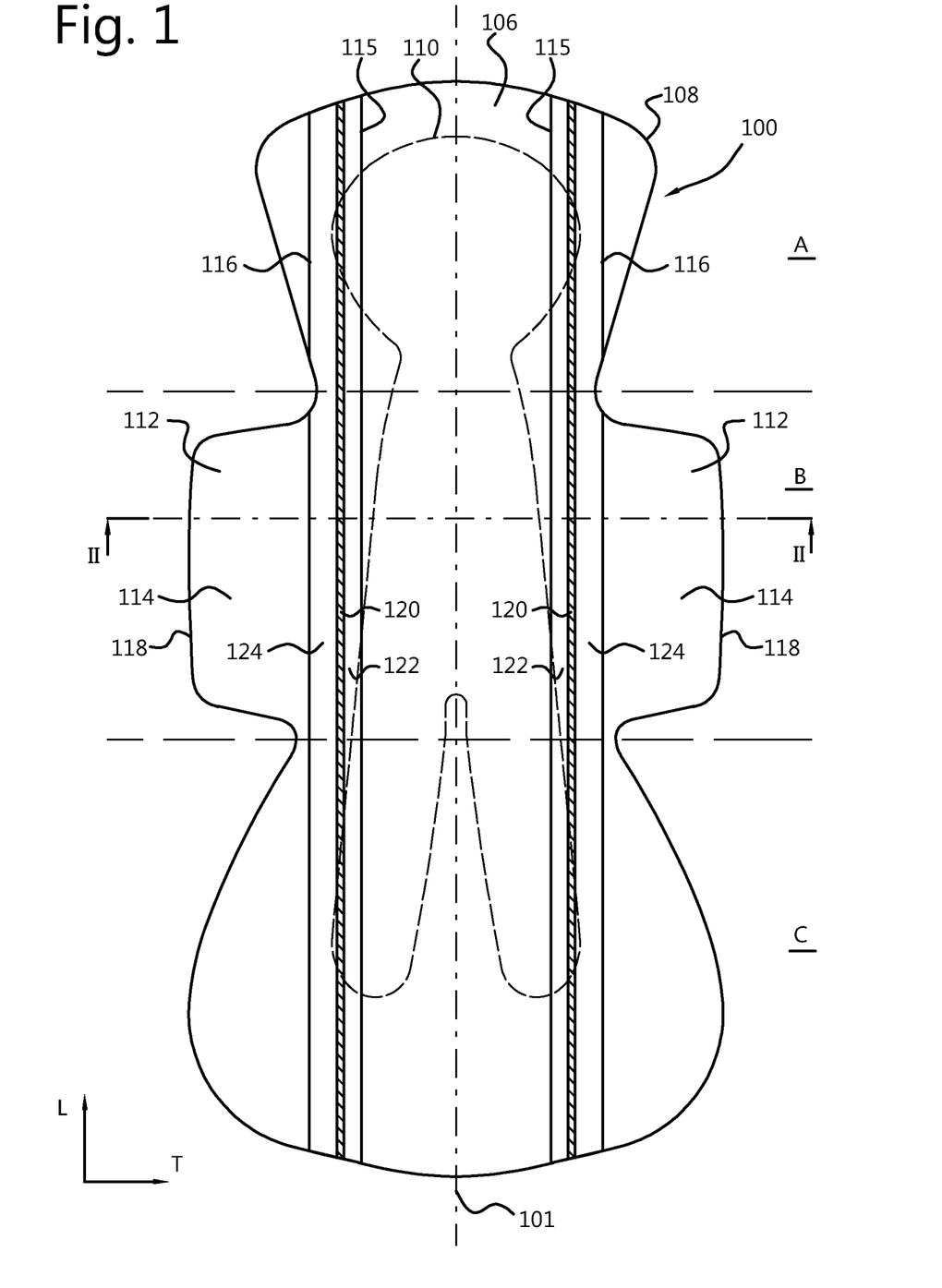
FIG. 1 shows a top view of a first embodiment of a disposable hygiene article according to the present disclosure.

The article 100 has a "body facing side" intended to face the body of the user, in particular to face the body in the crotch area of the user when the article is worn, and a "garment facing side" intended to face the garment, in particular the undergarment or briefs when the article is worn. FIG. 1 shows a view onto the article 100 from the body facing side.

The article 100 has a longitudinal direction L and a transverse direction T and has a longitudinal centre axis 101 which extends substantially in the middle of the absorbent part of the article. The article may be generally symmetrical with respect to this longitudinal centre axis, though this is not essential.

The article 100 may comprise a front portion A, a middle portion B and a rear portion C in the longitudinal direction L of the article. The front and rear portions A, C may be shaped to assist the user in optimally positioning the article 100 in their garment. The article 100 may be adapted for being folded in three with the front and rear portions A, C folded over the middle portion B when the article is individually packaged for delivery to a consumer. The article may be individually packaged by for example wrapping a thin plastic material around the article.

Figure 2:
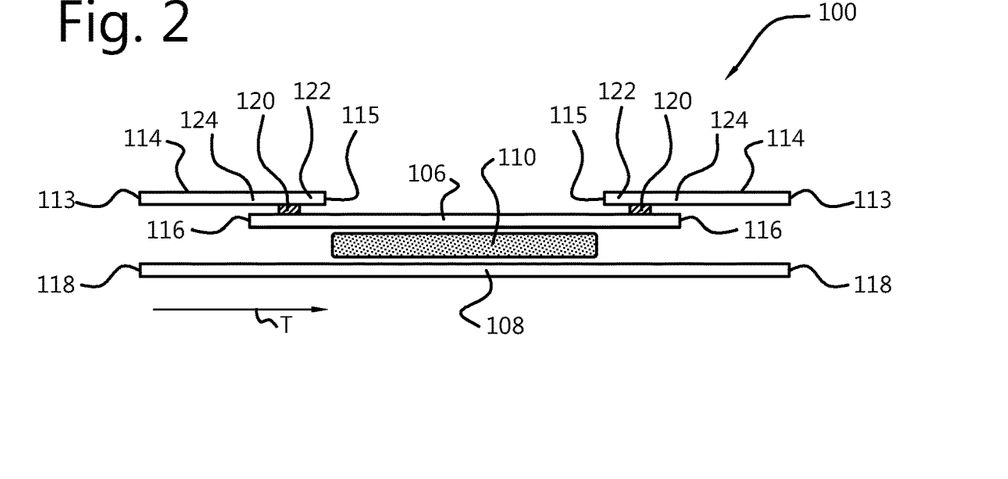
FIG. 2 is a cross-sectional (exploded) view of the article along the line II-II shown in FIG. 1.

The disposable hygiene article 100 comprises a liquid-permeable topsheet 106, a liquid-impermeable backsheet 108 and an absorbent core 110, preferably comprising an absorbent material. The liquid-permeable topsheet 106 is arranged at the body facing side of the article and is intended to be in contact with the body of the user, in particular with the crotch area of the user. The liquid-impermeable backsheet 108 is arranged at the garment facing side of the article and is intended to be in contact with the garment. The absorbent core 110 is arranged between and preferably enclosed by the topsheet 106 and the backsheet 108. By liquid-permeable is meant that liquid, such as urine, blood or water, can pass through the material. By liquid-impermeable is meant that liquid, such as urine, blood or water, substantially cannot pass through the material. By absorbent material is meant material that is capable of absorbing or soaking up liquid, such as urine, blood or water.

Figure 5:
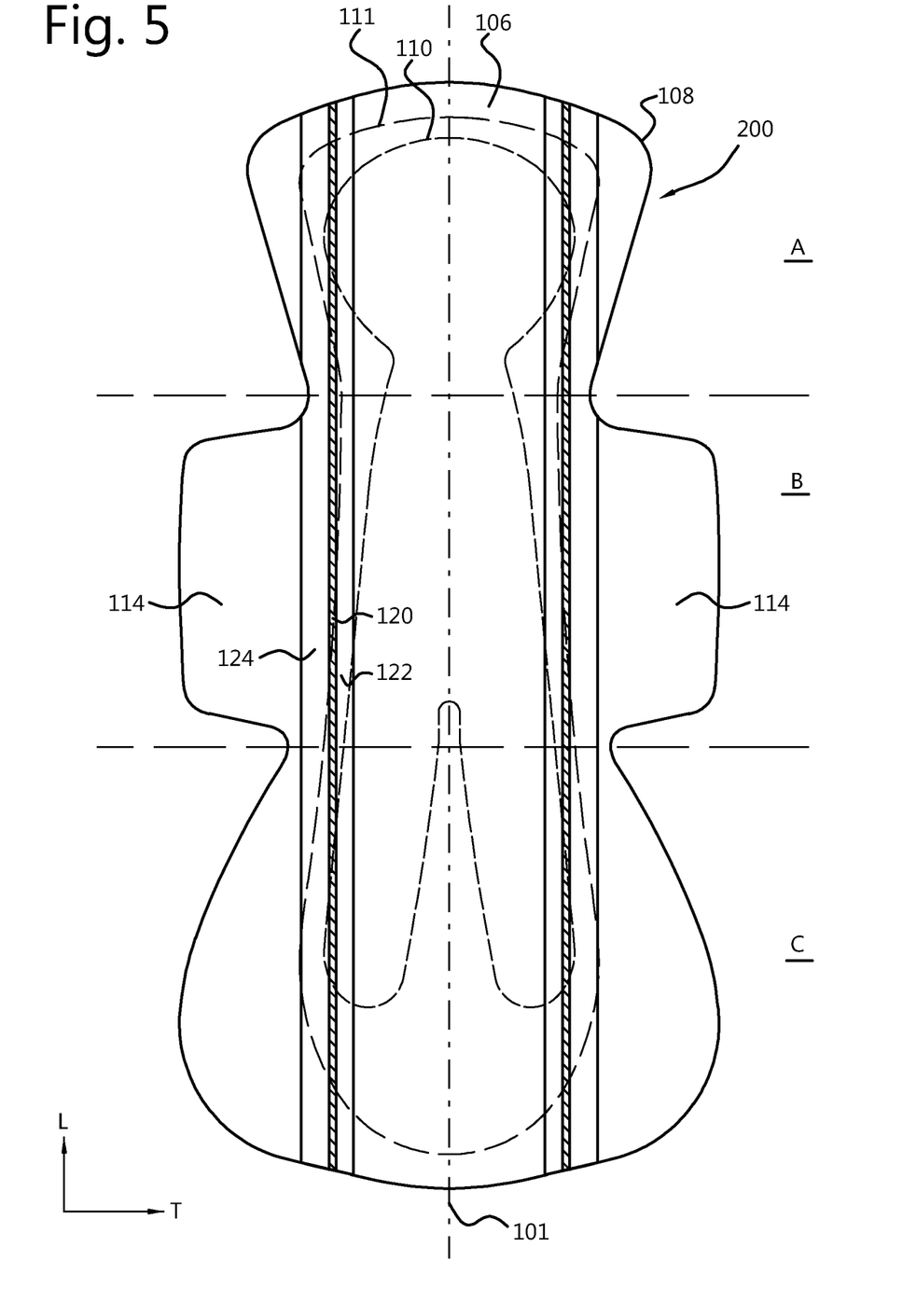
FIG. 5 shows a top view of a third embodiment of a disposable hygiene article according to the present disclosure.

The article 100 may comprise further layers or sheets, such as an acquisition layer 111 (see FIG. 5). An acquisition layer is preferably located beneath the topsheet 106, and is more preferably in contact with the garment facing side (i.e. the side facing the core 110) of the topsheet. The acquisition layer is intended to quickly absorb liquid and to spread the liquid before it is transported to the absorbent core, where it is retained. The acquisition layer preferably comprises an air-laid layer or wadding. The acquisition layer can be joined with the topsheet. The topsheet and the optional acquisition layer may be attached together by embossing, by using an adhesive or by means of ultrasonic processing to form a laminate. If the layers are attached together by means of ultrasonic processing, at least one of the topsheet or acquisition sheet comprises a thermoplastic material.

The other layers or sheets of the article 100 may be laminated together or the other layers may be attached together by means of embossing or adhesive. When laminated together the sheets are joined by means of a reinforcement executed with ultrasonic processing essentially along the peripheral edge of the sheets that forms an edge seal of the laminate so that the risk of any leakage and spread of liquid via the peripheral edge is minimized or eliminated. The reinforcement can extend from the periphery and towards the inside of the article for a distance of about 2-6 mm.

The topsheet 106 usually includes polyester or other synthetic polymer fibers, or films and is provided on the body facing side of the hygiene article. The topsheet is provided for comfort and conformability and for directing the liquid to the underlying absorbent core. The liquid-permeable topsheet 106 is preferably manufactured from a material that exhibits characteristics such as dryness and softness during the time when the absorbent article is being worn, because the topsheet 106 is in contact with the user's body. It is also desirable for the topsheet 106 to have a soft and textile-like surface which remains dry, even in the event of repeated wetting. The topsheet 106 can consist of or comprise a nonwoven material, for example, with a soft and smooth surface, such as a spunbond material made from polypropylene fibres. A perforated, hydrophobic nonwoven material may be used in order to permit the surface that is closest to the user's body to be kept dry, in conjunction with which openings are formed in the material that are larger than the holes between the fibres in the material. In this way, liquid can be led down through the perforated openings in the topsheet to the subjacent absorbent core. Other examples of materials for the topsheet are perforated plastic films such as a perforated polyester film attached to a nonwoven sheet. The topsheet may also be manufactured from a spunbond nonwoven material, an air-through nonwoven material, a spunlace nonwoven (hydroentangled) material, a meltblown nonwoven material, or a combination of these, such as a SMS-material, which is a layered product including spunbond-meltblown-spunbond nonwoven materials. The raw material can be polypropylene (PP), polyethylene (PE) polyester (PET), polyamide (PA), or a combination of these. If a combination is used, this can be a mixture of fibres from different polymers, although each fibre can also include different polymers (e.g. PP/PE bi-component fibres or PP/PE copolymers). Where appropriate, the plastic film can consist of or comprise PE or PP, PET, PLA or amyl (or, for that matter, any other thermoplastic polymer), or a mixture or copolymers of the aforementioned polymers. The topsheet preferably comprises a spunbond material comprising polypropylene fibres which provide for optimal comfort and handleability of the article. Other suitable fibres for making the nonwoven material are for example natural fibres such as bamboo, cotton and flax.

In the embodiment shown in FIG. 1, the absorbent core 110 has a specific shape, however the absorbent core 110 may also have another shape, for example a simpler shape like rectangular or oval. The absorbent core 110 may be manufactured from a fibre material in the form of natural or synthetic fibres with absorbent characteristics, or a mixture of natural fibres and synthetic fibres or other absorbent materials of a previously disclosed kind that are suitable for use in, for example, sanitary towels, incontinence pads and panty liners. The absorbent core may comprise one or more layers of defibrillated cellulosic fibres, for example cellulose fluff pulp. Other materials, which may be used, are for example absorbing or wettable nonwoven materials, foam materials or synthetic fibre materials.

The absorbent core 110 may comprise superabsorbent materials or may be free of superabsorbent material. In case the absorbent core comprises superabsorbent materials, the amount of superabsorbent materials ranges preferably between 1% and 30% by weight of the absorbent core. The superabsorbent material may be polymeric materials in the form of particles, fibres, flakes or the like, and the material possesses the ability to absorb and chemically bind liquid equivalent to several times their own weight to form an aqueous gel. This imparts a very high liquid-absorbent capacity to the finished hygiene article while the article is still soft and easy to handle and manufacture.

Different layers of the article 100 may be laminated together or may be attached together for example by means of embossing or by means of an adhesive. The side layers 112 are for example laminated or attached to the backsheet, for example by means of embossing or by means of an adhesive.

In the embodiment shown in FIGS. 1 and 2, the topsheet 106 extends transversally, i.e. in the transverse direction T, from the longitudinal centre axis 101 beyond the edges of the absorbent core 110 (i.e. beyond the longitudinal side edges of the absorbent core 110) up to longitudinal side edges 116.

In the embodiment shown in FIGS. 1 and 2, the backsheet 108 extends transversally, i.e. in the transverse direction T, from the longitudinal centre axis 101 beyond the longitudinal side edges 116 of the topsheet 106. Preferably, at least in the middle portion B of the article 100, the backsheet 108 extends up to longitudinal side edges 118, so that the backsheet 108 has side portions which form a bottom layer of the flexible side flaps 112 on either side of the absorbent core 110. In the embodiment shown, the backsheet 108 also extends beyond the longitudinal side edges 116 of the topsheet 106 in the front and rear parts A and C, but this can be carried out differently.

In alternative embodiments, the longitudinal side edges 116 and 118 of the topsheet 106 and the backsheet 108 could coincide in the front part A and/or the rear part C and/or even in the middle part. In the latter case, the side flaps 112 may be formed by a single layer, namely the side layer 114 described herein, or by a combination of this side layer 114 and another layer.

In the embodiment shown in FIGS. 1 and 2, the flexible side flaps 112 comprise the side portions of the backsheet 108 and, on each side, a side layer 114. This side layer 114 extends transversally from an inner longitudinal edge 115 up to an outer longitudinal edge 113. The inner longitudinal edge 115 is, on each side, located between the longitudinal side edge 116 of the topsheet 106 and the centre axis 101, preferably closer to the longitudinal side edge 116 so as to cover only an edge portion of the absorbent part of the article. The side layer 114 may be attached to the topsheet 106 by means of a seam 120. This seam 120 partitions the side layer 114 in a first part 122 and a second part 124 with said first part 122 extending from the seam 120 towards the longitudinal centre axis 101 up to the inner longitudinal edge 115 and said second part 124 extending from the seam 120 away from the longitudinal centre axis 101 up to the outer longitudinal edge 113. The first part 122 extends above the topsheet 106 and is loose therefrom at least in the middle portion B of the article 100, and in use forms a liquid side barrier on the respective side of the absorbent part of the article.

In the embodiment shown in FIGS. 1 and 2, the seam 120 is located substantially in the middle of the area of overlap of the side layer 114 and the topsheet 106, i.e. substantially in the middle between the respective edges 115 and 116. In other embodiments, the seam may be located closer towards the one edge or the other. The first part 122, forming the liquid side barrier in use, preferably has a length, measured in transverse direction T, of 2.0 to 10.0 mm, preferably 3.0 to 7.0 mm.

In the embodiment shown in FIGS. 1 and 2, the topsheet has longitudinal edge portions 107 which may be provided with coloured indications to indicate or highlight the presence of the liquid side barriers 122 to the user. This coloured indication may be printed on the topsheet 106 underneath each of said first parts 122, possibly throughout the areas of overlap between the respective edges 115 and 116. This print may be provided on the garment facing side of the topsheet 106, possibly in the same process step as a further coloured indication which is applied in the middle part of the topsheet 106 (where the absorbent core 110 is located). The topsheet is, due to its liquid permeability, a layer of translucent material, and preferably also the side layer 114 is made of a translucent material. The at least one layer which is/are located above the coloured indications are translucent in such a way that the coloured indications are to some extent visible to the user through said layer(s).

In the embodiment shown in FIGS. 1 and 2, the side layer 114 is also present in the front and rear parts A and C, i.e. the seam 120 is a longitudinal seam extending over the full length of the article 100 in the longitudinal direction L. However, this is not essential.

The seam 120 can be obtained by any technique suitable to secure the side layer 114 to the topsheet 106 for example by welding, such as ultrasonic welding, by applying a chemical compound such as an adhesive, by applying heat and/or pressure.

In the embodiment shown in FIGS. 1 and 2, the outer longitudinal edge 113 of the side layer 114 coincides with the longitudinal side edge 118 of the backsheet 108 and these two layers are attached to each other along these edges 113, 118. This is preferred in this embodiment as this may simplify the manufacturing process (simultaneous cutting and attachment step), but is not essential.

In the embodiment shown in FIGS. 1 and 2, the article 100 comprises side flaps 112 which comprise the side layers 114 and side portions of the backsheet 108 which are attached to each other. These side flaps 112 or wings are configured for being folded about the garment to secure the position of the hygiene article 100 with respect to the garment. To this end, the flexible side flaps 112 may be suitably provided with a pressure sensitive adhesive provided on the garment facing side of the backsheet 108. Such adhesive may also be provided on the garment facing side of the backsheet 108 underneath the absorbent part of the article.

Figure 4:
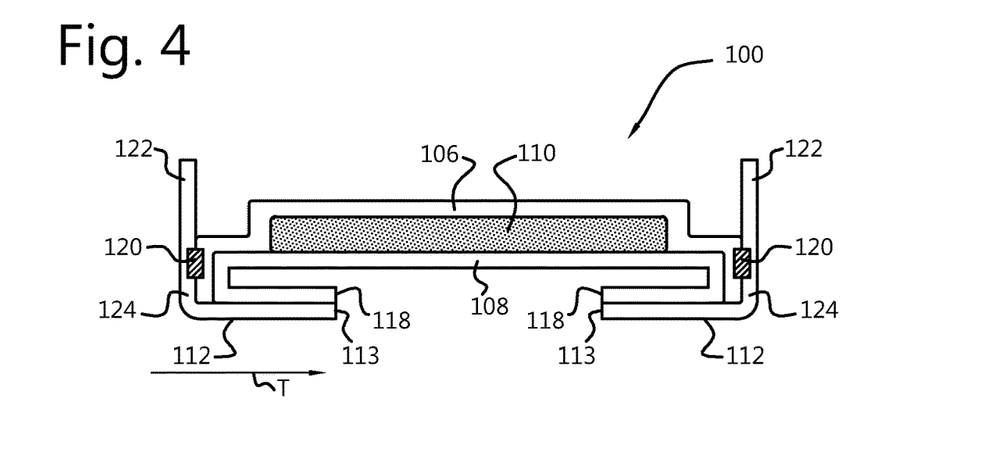
FIG. 4 is a cross-sectional view of the article of FIGS. 1 and 2 while in use.

In the embodiment shown in FIGS. 1 and 2, the side flaps 112 are intended to be folded substantially along the seam 120, or substantially along the coloured indications 131, as shown in FIG. 4, whereby the first parts 122 of the side layers 114 may be raised to a substantially upright position. The substantially upright position of these first parts 122 may enhance the functioning as barrier for the liquid. The movement to the substantially upright position may result from tension which is created by folding the side flaps 112. Thus, it may not be needed to provide elastic elements, such as for example elastic fibres or threads, in or on the material of the side layers 114 to achieve said movement, which may simplify the structure of the article 100. However, in alternative embodiments, such elastic elements may be applied to ensure or improve the raising of the side barriers 122.

Figure 3:
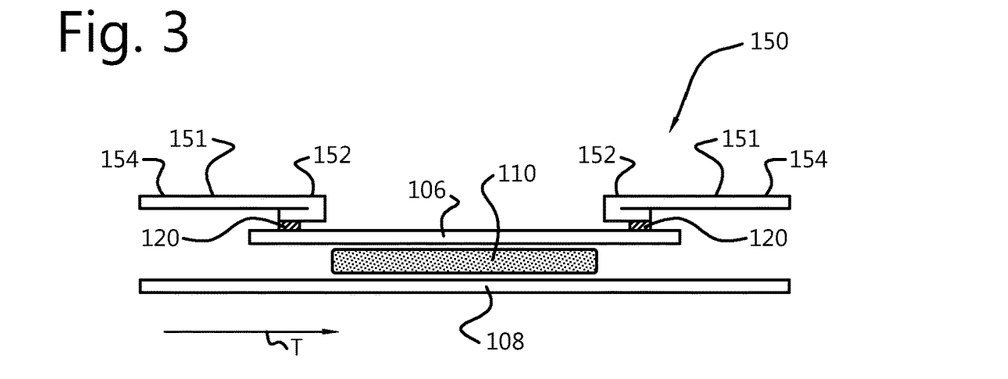
FIG. 3 is a cross-sectional (exploded) view of a second embodiment of a disposable hygiene article according to the present disclosure.

FIG. 3 shows an alternative embodiment of a disposable hygiene article 150 according to the present disclosure. This embodiment is in many aspects the same as that of FIGS. 1 and 2 and like parts are indicated with like reference numbers, so only the differences will be discussed here. In this embodiment, the side flaps comprise, on each side, a side portion of the backsheet 108 and a side layer 151 which is partitioned by the seam 120 into a first part 152 and a second part 154. In this embodiment, the first part 152 is a folded part of the side layer 151, such that the first part 152 comprises two layers of the material, which may create a stronger side barrier in use. In alternative embodiments, the folded part may also extend further, i.e. outwards beyond the seam 120, or the side layer may be entirely formed by a two layers of the material, folded at the inner longitudinal edge, or the side layer 151 may be folded multiple times to create a multi-layer side barrier 152, for example a Z-folded part.

FIG. 5 shows another embodiment of a disposable hygiene article 200 according to the present disclosure. This embodiment is in many aspects the same as that of FIGS. 1 and 2 and like parts are indicated with like reference numbers. A difference is that the article 200 comprises an acquisition layer 111, as described elsewhere herein, located in between the topsheet 106 and the core 110.

In all embodiments, the side layers 114, 151 may comprise a hydrophobic material to further reduce the risk of side-edge leakage, although this is not essential. The side layers may for example comprise a hydrophobic non-woven material or a hydrophobic spunbond material. Furthermore a hydrophobic coating layer can be applied on the material of the side layer or the material of the side layer can be treated for example with surfactants to adjust its degree of hydrophilicity.

Figure 6:
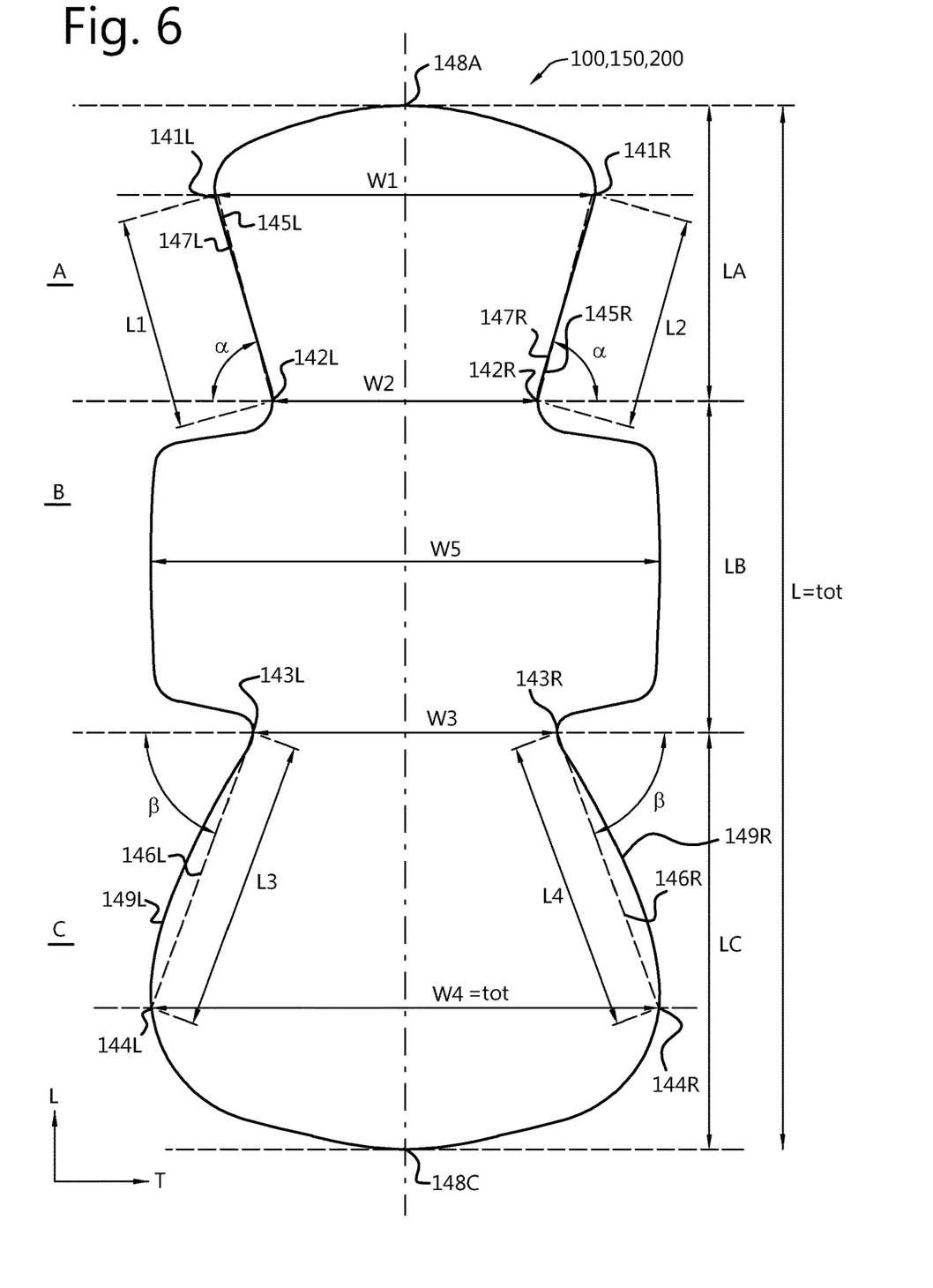
FIG. 6 schematically shows the outer shape of the embodiments of FIGS. 1-5.

FIG. 6 shows the outer shape of the embodiments of FIGS. 1-5. The front portion A of the article 100 is intended to be oriented upwards towards the user's belly during use of the article. The front portion has a generally tapering shape with a first, maximum width W1 which is measured in transverse direction T between first left and right edge points 141L, 141R, which are located on opposite sides of said longitudinal axis 101, and a second, minimum width W2 which is measured in transverse direction T between second left and right edge points 142L, 142R, also located on opposite sides of said longitudinal axis 101.

A first imaginary connection line 145R connects the first right edge point 141R to the second right edge point 142R and a second imaginary connection line 145L connects the first left edge point 141L to the second left edge point 142L. The first and second imaginary connection lines 145R, 145L extend each in an angle α ranging between 70° and 80° with said transverse direction T and have each a length L1, L2 of at least 15% of the full length Ltot (=LA+LB+LC) of the article, preferably between 20% and 30% of said full length. In an embodiment, preferably, the angle and the length may be substantially the same for both the first and second imaginary connection lines 145R, 145L, but this is not essential.

As shown in FIG. 6, the front portion A preferably has left and right side edges 147R, 147L extending substantially along said first and second imaginary connection lines 145R, 145L. The front portion A may further have a convex, arc-shaped front edge 148A which connects the first left and right edge points 141L, 141R. This front edge 147 may also be shaped differently, for example substantially straight.

In the embodiments shown, the article comprises, in said longitudinal direction L, the front portion A, a middle portion B and a back portion C. As shown in FIG. 6, the back portion C may have a generally tapering shape with a third, minimum width W3, which is measured in transverse direction T between third left and right edge points 143L, 143R, which are located on opposite sides of said longitudinal axis 101, and a fourth, maximum width W4, measured in transverse direction T between fourth left and right edge points 144L, 144R, also on opposite sides of said longitudinal axis 101. As shown, the back portion C may have a larger area than the front portion A. Further, as shown, the fourth width W4 is greater than the first width W1.

As shown in FIG. 6, a third imaginary connection line 146R connects the third right edge point to the fourth right edge point and a fourth imaginary 146L connection line connects the third left edge point to the fourth left edge point, and the third and fourth imaginary connection lines 146R, 146L preferably each extend in an angle β ranging between 60° and 70° with said transverse direction T and each have a length L3, L4 of at least 9% of the full length Ltot, preferably between 15% and 30% of the full length Ltot. In an embodiment, preferably, the angle and the length may be substantially the same for both the third and fourth imaginary connection lines 146R, 146L, but this is not essential.

As shown in the embodiment of FIG. 6, the back portion C preferably has left and right side edges 149R, 149L extending substantially along said third and fourth imaginary connection lines 146R, 146L, in particular slightly outward therefrom along a convex arc. The back portion C may further have a convex, arc-shaped back edge 148C which connects the fourth left and right edge points 144L, 144R. This back edge 148C may also be shaped differently, for example substantially straight.

As shown in FIG. 6, the front portion A has a length LA in said longitudinal direction L, with LA preferably ranging between 22% and 32% of said full length Ltot. The middle portion B has a length LB in said longitudinal direction L, in an embodiment ranging between 27% and 35% of said full length Ltot. The back portion C has a length LC in said longitudinal direction L, in an embodiment preferably ranging between 35% and 45% of said full length Ltot.

The widths shown in FIG. 6 may be as follows. The first width W1 may range between 62% and 88% of the full width Wtot of the article, the second width W2 may range between 45% and 65% of said full width Wtot, the third width W3 may range between 45% and 65% of said full width Wtot, and/or the fourth width W4 may range between 62% and 100% of said full width Wtot. The fourth width W4 may thus be the full width of the article. Alternatively, the full width of the article may for example be formed by the width W5 of the middle portion B.

The total length Ltot of the article may for example range between 250 and 350 mm and the total width Wtot of the article may for example range between 110 and 200 mm. The lengths L1, L2 of the first and second imaginary connection lines 145R, 145L are, in an embodiment, preferably at least 50 mm. The lengths L3, L4 of the third and fourth imaginary connection lines 146R, 146L are, in an embodiment, preferably at least 30 mm.

The invention claimed is:

1. A disposable hygiene article, comprising:
a liquid-permeable topsheet, a liquid-impermeable backsheet and an absorbent core arranged between said topsheet and said backsheet, the absorbent core defining a longitudinal centre axis which extends substantially in the middle of the core in longitudinal direction (L) of the article; and
liquid side barriers arranged substantially along longitudinal edges of said absorbent core and provided to reduce side-edge leakage;
wherein the article has a front portion which is intended to be oriented upwards towards the user's belly during use of the article, the front portion having a generally tapering shape with a first, maximum width (W1) of the front portion, measured in transverse direction (T) between first left and right edge points on opposite sides of said longitudinal axis, and a second, minimum width (W2) of the front portion, measured in transverse direction (T) between second left and right edge points on opposite sides of said longitudinal axis;
wherein a first imaginary connection line connects the first right edge point to the second right edge point and a second imaginary connection line connects the first left edge point to the second left edge point;
wherein the article has a full length (Ltot) in said longitudinal direction (L) and a full width (Wtot) in a transverse direction (T);
wherein the first and second imaginary connection lines extend in an angle (α) ranging between 60° and 90° with said transverse direction (T) and have a length (L1, L2) of at least 15% of said full length (Ltot).

2. The disposable hygiene article according to claim 1, wherein said angle (α) of the first and second imaginary connection lines ranges between 65° and 85°.

3. The disposable hygiene article according to claim 1, wherein said length (L1, L2) of the first and second imaginary connection lines ranges between 15% and 37% of said full length (Ltot).

4. The disposable hygiene article according to claim 1, wherein the front portion has left and right side edges extending substantially along said first and second imaginary connection lines.

5. The disposable hygiene article according to claim 1, wherein the article comprises, in said longitudinal direction (L), the front portion, a middle portion and a back portion, the back portion having a generally tapering shape with a third, minimum width (W3) of the back portion, measured in transverse direction (T) between third left and right edge points on opposite sides of said longitudinal axis, and a fourth, maximum width (W4) of the back portion, measured in transverse direction (T) between fourth left and right edge points on opposite sides of said longitudinal axis, and wherein the back portion has a larger area than the front portion.

6. The disposable hygiene article according to claim 5, wherein the fourth width (W4) is greater than the first width (W1).

7. The disposable hygiene article according to claim 5, wherein a third imaginary connection line connects the third right edge point to the fourth right edge point and a fourth imaginary connection line connects the third left edge point to the fourth left edge point, and wherein the third and fourth imaginary connection lines extend in an angle (β) ranging between 40° and 85° with said transverse direction (T) and have a length (L3, L4) of at least 9% of said full length (Ltot).

8. The disposable hygiene article according to claim 7, wherein said angle (β) of the third and fourth imaginary connection lines ranges between 50° and 75°.

9. The disposable hygiene article according to claim 7, wherein said length (L3, L4) of the third and fourth imaginary connection lines (146R, 146L) ranges between 9% and 44% of said full length (Ltot).

10. The disposable hygiene article according to claim 1, wherein the front portion has a length (LA) in said longitudinal direction ranging between 22% and 32% of said full length (Ltot).

11. The disposable hygiene article according to claim 5, wherein the middle portion has a length (LB) in said longitudinal direction ranging between 27% and 35% of said full length (Ltot).

12. The disposable hygiene article according to claim 5, wherein the back portion (C) has a length (LC) in said longitudinal direction ranging between 35% and 45% of said full length (Ltot).

13. The disposable hygiene article according to claim 1, wherein the first width (W1) ranges between 62% and 88% of said full width (Wtot).

14. The disposable hygiene article according to claim 1, wherein the second width (W2) ranges between 45% and 65% of said full width (Wtot).

15. The disposable hygiene article according to claim 5, wherein the third width (W3) ranges between 45% and 65% of said full width (Wtot).

16. The disposable hygiene article according to claim 5, wherein the fourth width (W4) ranges between 62% and 100% of said full width (Wtot).

17. The disposable hygiene article according to claim 1, wherein said liquid side barriers are at least partly formed by portions of side layers which extend above said topsheet and are at least partly loose therefrom.

18. The disposable hygiene article according to claim 1, wherein said liquid side barriers are provided for being at least partly raised to a substantially upright position in use.

19. The disposable hygiene article according to claim 1, further comprising flexible side flaps arranged on opposite sides of said absorbent core and provided for attaching said article to a garment.

20. The disposable hygiene article according to claim 19, wherein said liquid side barriers are provided for being at least partly raised by folding said flexible side flaps to a position in which said hygiene article is secured to said garment.

21. The disposable hygiene article according to any claim 19, wherein said liquid side barriers are provided for being at least partly raised by folding said flexible side flaps substantially along coloured indications.

22. The disposable hygiene article according to claim 17, wherein said side layers each comprise a multiple layered section where the side layer is folded at least once, said multiple layered sections forming, or forming part of, said liquid side barriers.

23. The disposable hygiene article according to claim 17, wherein said portions of said side layers, which form the liquid side barriers or part thereof, extend over the full length of the article.

24. The disposable hygiene article according to claim 17, wherein portions of said side layers, which form the liquid side barriers or part thereof, have a width in transverse direction T of the article ranging from 2.0 to 10.0 mm.

25. The disposable hygiene article according to claim 1, wherein the liquid side barriers consist entirely of non-elastic material.

26. The disposable hygiene article according to claim 1, wherein said article further comprises an acquisition layer positioned between said absorbent core and said topsheet.

* * * * *